United States Patent [19]
Gray

[11] Patent Number: 5,159,522
[45] Date of Patent: Oct. 27, 1992

[54] ELECTRIC CLUTCH ACTUATOR

[75] Inventor: Larry O. Gray, Berkey, Ohio

[73] Assignee: Dana Corporation, Toledo, Ohio

[21] Appl. No.: 485,953

[22] Filed: Feb. 27, 1990

[51] Int. Cl.$^5$ ........................................... H01H 47/22
[52] U.S. Cl. ............................... 361/154; 192/84 AB; 310/78; 361/189; 361/195; 361/210
[58] Field of Search ............... 361/152, 153, 154, 160, 361/170, 171, 172, 186, 189, 190, 194, 195, 206, 210; 192/84 R, 84 A, 84 AB; 310/78, 92, 94, 96

[56] References Cited

U.S. PATENT DOCUMENTS

| | | | |
|---|---|---|---|
| 3,387,154 | 6/1968 | Meier | 310/94 |
| 3,506,863 | 4/1970 | Fallis | 310/94 |
| 3,609,424 | 9/1971 | Murakami | 310/93 |
| 3,629,633 | 12/1971 | O'Callagham | 310/94 |
| 4,338,651 | 7/1982 | Henrich | 361/154 |
| 4,473,862 | 9/1984 | Hill | 361/154 |
| 4,509,091 | 4/1985 | Booth | 361/154 |
| 4,609,965 | 9/1986 | Baker | 361/160 |
| 4,734,817 | 3/1988 | Baker et al. | 361/190 |
| 4,885,658 | 12/1989 | Büchl | 361/154 |

Primary Examiner—Jeffrey A. Gaffin
Attorney, Agent, or Firm—William J. Clemens

[57] ABSTRACT

An electric clutch actuator includes a coil having first and second windings, a first end of the first winding being connected to a source of electrical power and a second end of the second winding being connected through a switch such as an FET (field effect transistor) to ground potential. The opposite ends of the windings are connected together through another FET switch to the ground potential. An actuation circuit is responsive to a control signal to turn on the FET switches and cause electrical current to flow primarily through the first winding. The actuation circuit includes a timing circuit which turns off the FET connected to the opposite ends of the windings after a predetermined period of time to cause electrical current from the power source to pass through both of the windings. In a second embodiment, a coil is connected in series with an FET switch to the power supply and the actuation circuit turns on the FET for a predetermined period of time to apply the full voltage of the power supply to the coil thereby rapidly actuating the electromagnetic clutch and then generates a pulsed wave form to alternately turn on and off the FET to hold the electromagnetic clutch in the actuated position.

8 Claims, 2 Drawing Sheets

ELECTRIC CLUTCH ACTUATOR

BACKGROUND OF THE INVENTION

The present invention relates generally to clutches and, in particular, to electric control circuits for electromagnetically actuated clutches.

In order to overcome high spring and/or initial loading and to obtain rapid actuation of an electromagnetic clutch, it is common to generate a magnetic force which is substantially greater than the force required to maintain the clutch in the actuated state. The greater magnetic force is generated by over-energizing an associated electromagnetic coil for a relatively short period of time so that the coil is not damaged. One method to achieve such operation is to provide two different coils which differ in the number of winding turns. The coils are wound such that their magnetic fields reinforce each when both are energized. In a starting mode, an electronic circuit connects the coils in parallel to the power source for an improved speed of response. After a predetermined time, the coils are connected in series to the same power source for operation in a run mode.

SUMMARY OF THE INVENTION

The present invention concerns an apparatus for rapidly actuating an electromagnetic clutch. Typically, the clutch can be utilized to couple a driven shaft to rotate a drive shaft. The clutch includes a disk-shaped clutch plate having a central aperture formed therein for attachment to an end of the driven shaft. A clutch disk formed of a relatively high coefficient friction material is attached to a planar face of the clutch plate facing an end of the drive shaft. An annular clutch housing has a central aperture formed therein for attachment to an end of the drive shaft. The annular clutch housing includes a hollow interior in which an electromagnetic coil is installed.

In one embodiment, the coil has first and second windings, a first end of the first winding being connected to a source of electrical power and a second end of the second winding being connected through a first switch such as an FET (field effect transistor) to ground potential. The second end of the first winding and the first end of the second winding are connected together through a second FET switch to the ground potential. An actuation circuit is responsive to a control signal to turn on the first FET and the second FET. The actuation circuit includes a timing circuit which turns off the first FET after a predetermined period of time. Thus, during the predetermined period of time, both of the FETs are activated to cause electrical current from the power source to pass primarily through the first winding and rapidly actuate the clutch, and after the predetermined period of time, only the second FET remains turned on to cause electrical current from said power source to pass through both of the windings to maintain the actuated clutch.

In a second embodiment, the coil is connected in series with an FET switch to the power supply. An actuation signal circuit is responsive to a control signal for turning on the FET for a predetermined period of time to apply the full voltage of the power supply to the coil thereby rapidly actuating the electromagnetic clutch. When the predetermined time period expires, the actuation signal circuit generates a pulsed wave form to alternately turn on and off the FET. Thus, the coil is actuated at less than the maximum potential of the power source to generate a magnetic field to hold the electromagnetic clutch in the actuated position. For example, the duty cycle of the pulsed wave form can be fifty per cent to apply one half of the rapid actuation voltage to the coil during the holding mode.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
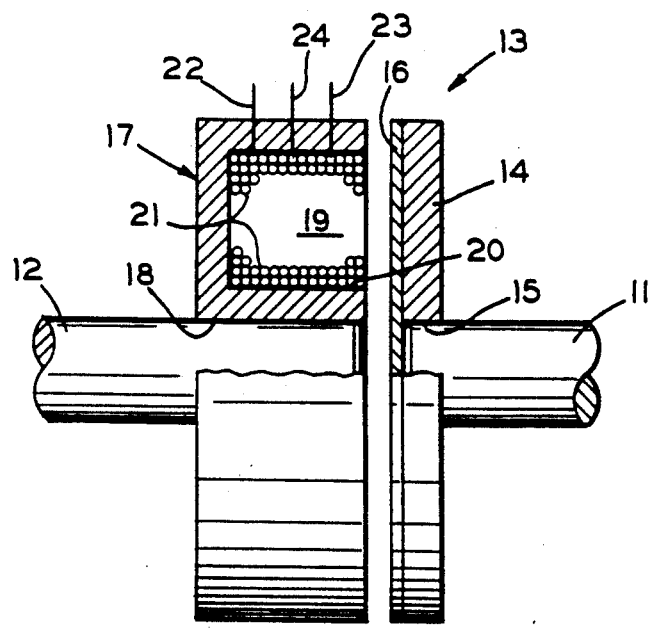
FIG. 1 is a fragmentary side elevational view in partial section of an electromagnetic clutch for use with the present invention.

As shown in FIG. 1, a driven shaft 11 can be coupled to rotate a drive shaft 12 by an electromagnetic clutch 13. A disk-shaped clutch plate 14 has a central aperture 15 formed therein for accepting an end of the driven shaft 11. The clutch plate 14 and the driven shaft 11 are fixedly attached for co-rotation. A clutch disk 16 formed of a relatively high coefficient friction material is attached to a planar face of the clutch plate 14 facing an end of the drive shaft 12.

A clutch housing 17 is annular in shape and has a central aperture 18 formed therein. An end of the drive shaft 12 extends into the central aperture 18 and the clutch housing 17 is fixedly attached to the drive shaft 12 for rotation therewith. The annular clutch housing 17 has a hollow interior 19. However, a wall of the clutch housing 17 adjacent the electromagnetic clutch disk 16 has been removed to form an opening 20 providing access to the hollow interior 19 for installing one or more electromagnetic coils such as a coil 21. The coil 21 is provided with lead wires such as a first lead wire 22 connected to one end of the coil and a second lead wire 23 connected to an opposite end of the coil. The coil 21 is formed from a pair of windings which are connected together at which point a third lead wire 24 is attached. The two windings should be sized to generate a ratio of actuating force to holding force as explained below.

Although the clutch plate 14 rotates with the driven shaft 11, the clutch plate 14 is free to move along the longitudinal axis of the driven shaft 11 toward the clutch housing 17. Thus, when the electromagnetic coil 21 is energized with electric power, an electromagnetic field is generated which attracts the clutch plate 14 and a facing surface of the clutch disk 16 frictionally engages a facing surface of the clutch housing 17. The drive shaft 12 is then frictionally coupled to the driven shaft 11 and is rotated thereby.

Figure 2:
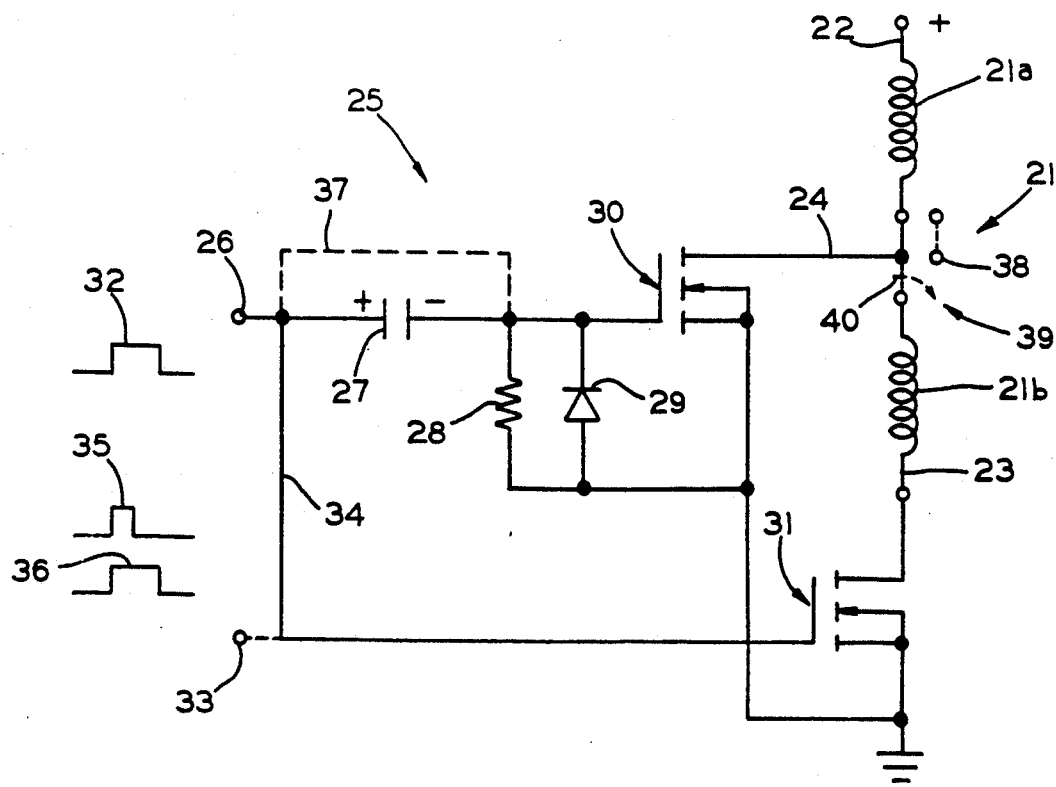
FIG. 2 is schematic diagram of an electromagnetic clutch actuation circuit in accordance with the present invention for use with the clutch shown in FIG. 1.

There is shown in FIG. 2 an electronic actuation circuit 25 for actuating the electromagnetic clutch 13 shown in FIG. 1. The first lead wire 22 of the electromagnetic coil 21 is connected to a positive potential terminal of an electrical power source (not shown). The electromagnetic coil 21 is formed from two separate windings 21a and 21b each having one end connected to the third lead wire 24. A first end of the first winding 21a is connected to the first lead 22, a second end of the second winding 21b is connected to the second lead wire 23, a second end of the first winding 21a and a first end of the second winding 21b are connected to the third lead 24, and the second lead 23 and the third lead 24 are connected to the circuit 25.

The circuit 25 has an input terminal 26 connected to one side of a capacitor 27. The other side of the capacitor 27 is connected to one end of a resistor 28 and a cathode of a diode 29. The other end of the resistor 28 and the anode of the diode 29 are connected together such that the resistor 28 and the diode 29 are connected in parallel. The junction of the capacitor 27, the resistor 28 and the diode 29 is connected to a gate of an FET (field effect transistor) 30. The FET 30 has a drain connected to the third lead wire 24 and a source connected to the anode of the diode 29 which is also connected to ground potential for the circuit. The input terminal 26 is also connected to a gate of a second FET 31. The FET 31 has a drain connected to the second lead wire 23 and a source connected to the circuit ground potential.

In operation, the full voltage of the power source (not shown) is applied only to the first winding 21a of the electromagnetic coil 21 initially. After a predetermined time, the two windings of the coil 21 are connected in series across the power supply. This operation allows the initial clutch actuation power to be applied with reduced inductance which decreases the actuation time of the clutch. The coil windings are then coupled in series to reduce the power draw and hold the clutch engaged.

The clutch 13 is actuated in response to the generation of a control signal 32 at the input terminal 26. The control signal 32 can be generated by any conventional means (not shown) which can generate a voltage pulse of predetermined magnitude and duration. The control signal functions as an actuation signal and at the leading edge of the control signal 32, the second FET 31 is caused to turn on. Since the voltage across a capacitor can not change instantaneously, the control signal 32 is transmitted through the capacitor 27 as an actuation signal to also turn on the first FET 30. As a result, current will flow from the power source (not shown) into the first lead wire 22 and through the first coil winding 21a. The current will then flow to the circuit ground potential through the third lead wire 24 and the FET 30. Since the voltage drop across the turned on FET 30 is relatively small, almost the full voltage of the power supply is applied across the coil winding 21a to provide a relatively rapid actuation of the electromagnetic clutch 13. Since the second FET 31 is also turned on, the opposite ends of the second coil winding 21b attached to the second lead wire 23 and the third lead wire 24 will be at virtually the same voltage and therefore little or no current will flow in the coil winding 21b.

When the control signal 32 is applied to the electronic actuation circuit 25, the capacitor 27 will begin to charge toward the full magnitude of the control signal 32. The capacitor and the resistor function as a timing circuit and the charging time will be defined by the values of the capacitor 27 and the resistor 28 which provide a charging path to the ground potential of the circuit. When the capacitor 27 has charged to a predetermined voltage level, the first FET 30 will be turned off. However, the second FET 31 will remain turned on by the control signal 32. Thus, current flow from the third lead wire 24 to ground potential will be blocked and instead the current will flow through the second coil winding 21b, the second lead wire 23 and the second FET 31 to the ground potential.

If the coil windings 21a and 21b were the same, such as one half of a single coil winding, the magnetic field generated by the coil winding 21a initially would be the same as the combined magnetic fields generated by the windings 21a and 21b when the first FET 30 is turned off. Obviously, when only the winding 21a is actuated, it will draw twice the amount of current from the power source as when the windings 21a and 21b are drawing current in series. The result is faster actuation time due to the initially lower inductance of the single winding 21a and the holding force of both windings in series with approximately one fourth the power dissipation. However, if the windings are formed of different size wires, this effect can be enhanced. The electromagnetic force generated is directly proportional to the product of the current flowing through the winding and the number of turns in the winding, or ampere-turns. Thus, the winding 21a can be formed of a first predetermined number of turns of larger diameter wire to generate the higher clutch actuation force. The winding 21b can be formed of a second predetermined number of turns of smaller diameter wire which, in series with the winding 21a, reduces the current flow and generates a sufficient lower holding force.

As an alternative, a second input terminal 33 could be provided and connected directly to the gate of the second FET 31 as shown in FIG. 2. A portion 34 of the line between the first input terminal 26 and the second input terminal 33 would be eliminated and the control signal source (not shown) would generate a pair of control signals 35 and 36. The control signal 35 would be of relatively short duration and be applied to the first input terminal 26. The capacitor 27, the resistor 28 and the diode 29 would be eliminated and the terminal 26 would be connected directly to the gate of the first FET 30 by a line 37. The second control signal 36 would be of longer duration and would be applied to the second input terminal 33. Thus, the control signals 35 and 36 function as actuation signals and the FET 30 and the FET 31 would initially be turned on at the same time and only the winding 21a would be energized for quick actuation of the electromagnetic clutch 13. At the end of the first control signal 35, the FET 30 would be turned off and current from the power source would flow through the windings 21a and 21b in series since the second FET 31 would remain turned on.

As a second alternative, the windings 21a and 21b could initially be energized in parallel and then switched to a series connection. A switch terminal 38 can be connected to the positive polarity terminal of the power source (not shown). The switch terminal 38 can be one of two terminals of a switch connected between the third lead wire 24 and the first end of the coil winding 21b. The switch 39 would be normally closed as shown in FIG. 2. The switch would then move in the direction of an arrow 40 to connect the first end of the winding 21b to the switch terminal 38. Thus, the windings 21a and 21b are connected in parallel to the power source (not shown). The switch 39 can be actuated by any suitable means in response to one of the control signals 32, 35 and 36 or the flow of current through the coil winding 21a.

Figure 3:
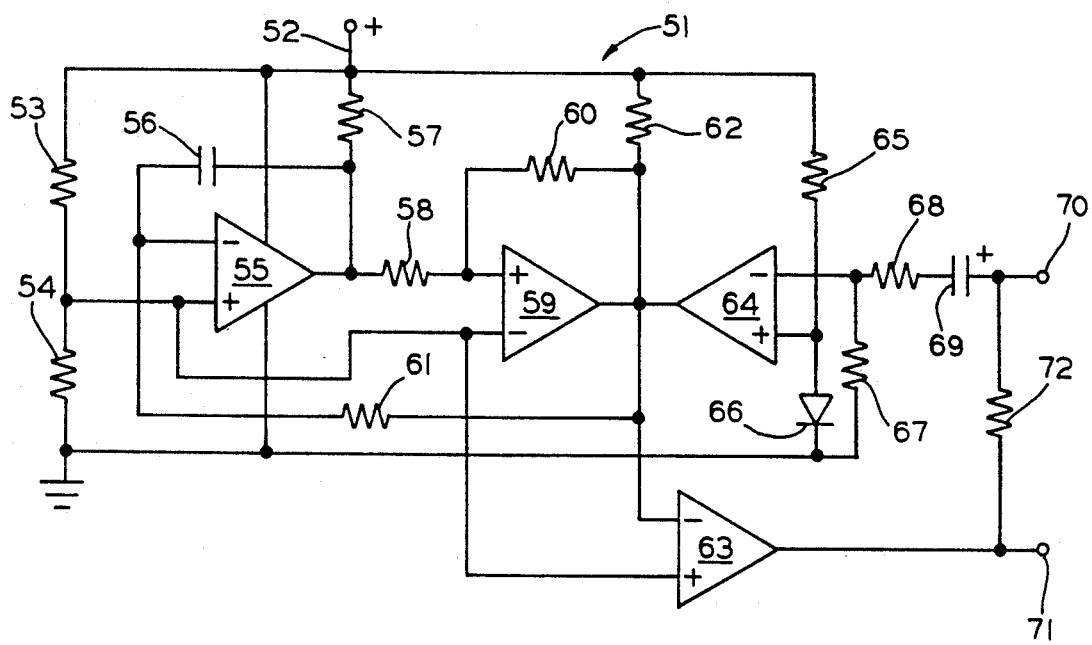
FIG. 3 is a schematic diagram of a portion of an alternate embodiment actuation circuit in accordance with the present invention for use with the clutch shown in FIG. 1.
Figure 4:
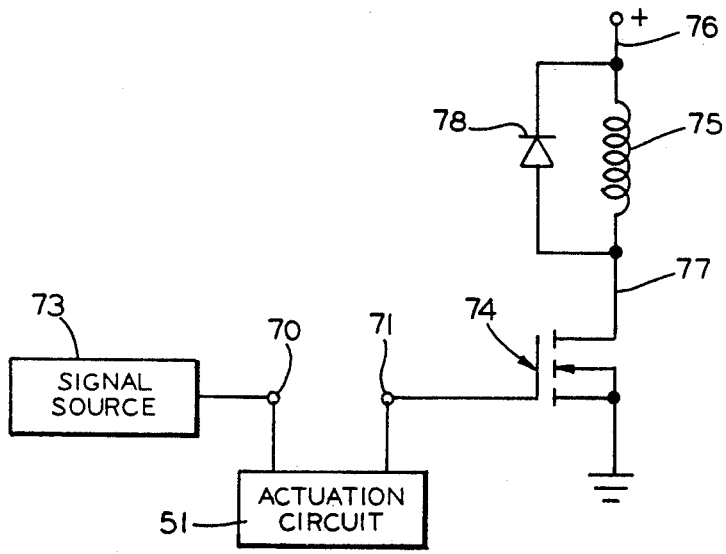
FIG. 4 is a schematic diagram of the remainder of the actuation circuit shown in FIG. 3.
Figure 5:
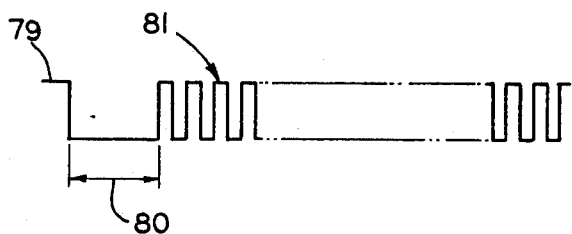
FIG. 5 is a wave form diagram of the clutch coil actuation pulses generated by the actuation circuit shown in FIGS. 3 and 4.

There is shown in FIGS. 3 through 5 another alternate embodiment of the electronic actuation circuit according to the present invention. An actuation circuit 51 is shown in FIG. 3. A power lead 52 is connected to a positive polarity terminal of a power source (not shown). The power lead 52 is also connected through a pair of series connected resistors 53 and 54 to a circuit ground potential. A junction of the resistors 53 and 54 is connected to a non-inverting input terminal of an operational amplifier 55. The amplifier 55 receives power through a pair of input terminals connected to the power lead 52 and the circuit ground potential. The other operational amplifiers discussed below have similar connections which are not shown.

An inverting terminal of the amplifier 55 is connected through a capacitor 56 to an output of the amplifier 55. The output of the amplifier 55 is also connected through a resistor 57 to the power lead 52 and through a resistor 58 to a non-inverting input of a second operational amplifier 59. The non-inverting input of the amplifier 59 is connected through a resistor 60 to an output of the amplifier 59. An inverting input of the amplifier 59 is connected to the non-inverting input of the amplifier 55 and the output of the amplifier 59 is connected through a resistor 61 to the inverting input of the amplifier 55. The output of the amplifier 59 is also connected through a resistor 62 to the power lead 52, to an inverting input of a third operational amplifier 63, and to an output of a fourth operational amplifier 64. The inverting input of the amplifier 59 is also connected to a non-inverting input of the amplifier 63.

The fourth amplifier 64 has a non-inverting input connected through a resistor 65 to the power lead 52 and connected to an anode of a diode 66 having a cathode connected to the circuit ground potential. The amplifier 64 has an inverting input connected through a resistor 67 to the circuit ground potential and connected through a resistor 68 and a capacitor 69 in series to a terminal 70. An output of the third amplifier 63 is connected to a terminal 71 and a resistor 72 is connected between the terminals 70 and 71.

As shown in FIG. 4, a signal source 73 has an output connected to the first terminal 70 of the actuation circuit 51. The second terminal 71 is connected to a gate of an FET 74. A coil 75 has one lead 76 connected to a positive potential terminal of a power supply (not shown). A lead 77 at the opposite end of the coil 75 is connected to a drain of the FET 74. A source of the FET 74 is connected to the circuit ground potential. A diode 78 has an anode connected to the lead 77 and a cathode connected to the lead 76 across the coil 75.

The signal source 73 generates a control signal to the terminal 70 and the actuation circuit 51 generates an actuation signal at the terminal 71 to turn on the FET 74. Prior to turning on the FET 74, the lead 77 was at the same potential as the lead 76 which is the positive polarity potential of the power source. FIG. 5 shows a wave form 79 generated at the lead 77 which is a mirror image of the actuation signal generated at the terminal 71. When the FET 74 is turned on, the lead 77 will drop in potential to approximately the circuit ground potential. Thus, almost the full magnitude of the power source potential is connected across the coil 75. The circuit 51 maintains this mode of operation for a period of time 80 shown in FIG. 5 to rapidly actuate the electromagnetic clutch.

At the end of the time period 80, the circuit 51 will generate a square wave form 81 having an approximately fifty per cent duty cycle. Therefore, if the potential of the power source (not shown) is twelve volts, for example, almost the entire twelve volts will be connected across the coil 75 during the actuation time period 80. Since the wave form 81 has a fifty per cent duty cycle, an average of approximately six volts will be applied to the coil 75 during the duration of the wave form 81. Therefore, if the coil 75 is sized to hold in the electromagnetic clutch 13 when a six volt potential is applied, the time period 80 of application of twelve volts will result in a faster actuation of the electromagnetic clutch. When the control signal is removed, the actuation circuit 51 discontinues the generation of the actuation signal.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An actuator for actuating an electromagnetic clutch comprising:
   a clutch actuation coil having first and second windings, a first end of said first winding adapted to be connected to a source of electrical power, and a second end of said first winding and a first end of said second winding being connected together at a junction;
   a first FET connected between said junction and a ground potential and being responsive to a first actuation signal for turning on and turning off after a predetermined period of time;
   a second FET connected between a second end of said second winding and the ground potential and being responsive to a second actuation signal for turning on; and
   an actuation circuit having an input terminal, a capacitor connected between said input terminal and a gate of said first FET, and a resistor connected between said gate of said first FET and the ground potential, the first actuation signal and the second actuation signal being generated by a control signal applied to said input terminal whereby said predetermined period of time, said first FET and said second FET are turned on to permit electrical current from a power source to pass primarily through said first winding, and whereby after said predetermined period of time, only said second switch is turned on to permit electrical current from a power source to pass through both of said windings, said predetermined time period being determined by values of said capacitor and said resistor.

2. The actuator according to claim 1 including a switch connected between said second end of said first winding and said first end of said second winding during said predetermined time period and being connected between said first end of said second winding and a source of electrical power when only said second FET is turned on.

3. The actuator according to claim 1 wherein said first winding is formed of a first predetermined number of turns of larger diameter wire for generating an actuation force and a first portion of a holding force, and said second winding is formed of a second predetermined number of turns of smaller diameter wire for generating a second portion of the holding force.

4. An electric clutch actuator comprising:
   a clutch actuation coil having a winding with opposite ends for connection to a source of electrical power;
   a switch connected to one of said ends of said winding for connection in series with said winding to the source of electrical power and being responsive to an actuation signal for turning on; and
   an actuation circuit connected to said switch and being responsive to a control signal for generating said actuation signal for turning on said switch and, after a predetermined time period, alternately turning off and on said switch until said control signal is removed,
   whereby during said predetermined time period, said switch is turned on to permit electrical current from a power source to pass through said winding, and
   whereby after said predetermined time period, said switch is controlled to reduce the electrical current from a power source passing through said winding.

5. The actuator according to claim 4 wherein said switch is an FET.

6. The actuator according to claim 4 wherein said actuation circuit generates said actuation signal with an approximately fifty per cent duty cycle after said predetermined time period until said control signal is removed.

7. The actuator according to claim 4 wherein said actuation circuit includes a first operational amplifier having a non-inverting terminal connected to a source of positive potential electrical power and having an inverting terminal connected through a first capacitor to an output of said first amplifier, said output also being connected through a first resistor to the source of positive potential electrical power and through a second resistor to a non-inverting input of a second operational amplifier, said non-inverting input of said second amplifier being connected through a third resistor to an output of said second amplifier, an inverting input of said second amplifier being connected to said non-inverting input of said first amplifier and said output of said second amplifier being connected through a fourth resistor to said inverting input of said first amplifier, said output of said second amplifier being connected through a fifth resistor to the source of positive potential electrical power, connected to an inverting input of a third operational amplifier, and connected to an output of a fourth operational amplifier, said inverting input of said second amplifier being connected to a non-inverting input of said third amplifier, said fourth amplifier having a non-inverting input connected through a sixth resistor to the source of positive potential electrical power and connected through a diode a circuit ground potential, said fourth amplifier having an inverting input connected through a seventh resistor to the circuit ground potential and connected through an eighth resistor and a second capacitor in series to a control signal input terminal, an output of said third amplifier being connected to an actuation signal output terminal and a ninth resistor being connected between said input and output terminals, said output terminal being connected to said switch.

8. The actuator according to claim 7 wherein said switch is an FET and said output terminal is connected to a gate of said FET.

* * * * *